United States Patent [19]

Guézou et al.

[11] Patent Number: 5,084,863
[45] Date of Patent: Jan. 28, 1992

[54] SYSTEM FOR INTERCHANGING MESSAGES IN REAL TIME BETWEEN STATIONS INTERCONNECTED BY A LOOP LINK, IN PARTICULAR BETWEEN STATIONS IN A TELECOMMUNICATIONS EXCHANGE

[75] Inventors: Jean Guézou, Lannion; Serge Le Goic, Penvenan; Christian Roche, Perros-Guirec, all of France

[73] Assignee: Alcatel Cit, Paris, France

[21] Appl. No.: 435,218

[22] Filed: Nov. 13, 1989

[30] Foreign Application Priority Data

Nov. 14, 1988 [FR] France ................. 88 14759

[51] Int. Cl.$^5$ .......................... H04J 1/16; H04J 3/14
[52] U.S. Cl. ................................... 370/16.1
[58] Field of Search .......... 370/16.1, 85.4, 85.5, 370/85.12, 85.9, 16

[56] References Cited

U.S. PATENT DOCUMENTS

| | | | |
|---|---|---|---|
| 4,380,061 | 4/1983 | Mori et al. | 370/16.1 |
| 4,566,097 | 1/1986 | Bederman | 370/85.5 |
| 4,805,169 | 2/1989 | Van Asselt | 370/85.9 |
| 4,926,418 | 5/1990 | Cidon et al. | 370/85.5 |

OTHER PUBLICATIONS

Computer Networks by Andrew S. Tanenbaum, 2nd edition, 1988, Prentice-Hall, Inc., sec. 1.4.2 & 3.4.3.

*Primary Examiner*—Douglas W. Olms
*Assistant Examiner*—Wellington Chin
*Attorney, Agent, or Firm*—Sughrue, Mion, Zinn, Macpeak & Seas

[57] ABSTRACT

The interchange system comprises stations connected to a loop link having two rings (A1, A2) making use of a token access method and operating in load sharing mode, with each ring providing all interchanges in the event of the other ring breaking down. Each station has one adapter (1, 2) per ring, a coupler (C), and a terminal (T). Each adapter performs level 1 procedures and lower layer level 2 procedures only. The coupler includes a processor and uses a protocol at the upper layer of level 2 and at level 3 for managing load sharing between the rings, for switching the station onto one ring in the event of the other ring breaking down, and for providing protection against transmisson errors, against messages being duplicated, and against messages being out of sequence, against breakdowns in the adapters and the rings, and against short traffic interruptions due to a station being inserted or withdrawn.

8 Claims, 2 Drawing Sheets

SYSTEM FOR INTERCHANGING MESSAGES IN REAL TIME BETWEEN STATIONS INTERCONNECTED BY A LOOP LINK, IN PARTICULAR BETWEEN STATIONS IN A TELECOMMUNICATIONS EXCHANGE

The invention relates to interchanging information between stations connected via a loop link.

BACKGROUND OF THE INVENTION

Various different loop links exist having ring topology and whose operating and connection characteristics are defined in the standard IEEE 802.

Within this document, standard 802-5 is applicable to ring topologies using a token access method, and it defines level 1 (physical level) and a portion of level 2 referred to as Medium Access Control (MAC), i.e. the lower layer of level 2. This is the data link level for defining the control of access to the ring.

Standard 802-2 relates to defining logic link control (LLC), i.e. a different portion of level 2, referred to as the upper layer.

Standard 802-1 relates to higher levels.

On the ring, a pattern of several bytes, called a token, circulates permanently. If no station is transmitting, then the token is free. When a station A desires to transmit, it seizes the token, marks it as being occupied, and transmits data in the form of a message to a destination station B. No other station can then transmit. As the message goes past, station B recognizes its own address, copies the data intended for itself, and marks an acknowledgement. On return of the message, the transmitting station A recognizes the acknowledgement and deletes the transmitted data together with the token busy state. The token is thus freed for all stations.

Using standard 802-5 has the following advantages:

a large number of stations, up to 256, can be connected to the ring, and stations can easily be added without interrupting traffic;

links between stations are asynchronous;

a single station can broadcast simultaneously to a plurality of other stations or to all of them;

the quality of message transmission between stations is excellent; and depending on requirements procedures are available for operating and protecting the ring.

With respect to quality of transmission and operating security, application of standard 802-5 makes the following possible:

automatic declaration of each station merely by being physically plugged onto the ring;

diagnosis of the access interface at each connection;

automatic declaration of a station having the task of token surveillance, and automatic replacement thereof by a different station in the event of the first station failing; and reconfiguration of the ring in the event of failure.

The characteristics of a token ring are the following:

At the physical level:

asynchronous point-to-point transmission enabling long physical connections to be used;

choice of physical medium depending on performance requirements, e.g. screened telephone pair, coaxial cable, or optical fiber;

various data rates: 4 Mbit/s; 16 Mbit/s; 100 Mbit/s;

an encoding law (Manchester) providing a first level of transmission protection;

data protecion by means of a cyclic redundancy check for detecting errors; and standardized components and protocols for the 4 Mbit/s version (standard 802-5);

At link level:

the lower layer MAC of level 2 is standardized (standard 802-5) and integrated in circuits of the adapters, with an example of such a circuit being sold by Texas Instruments under the reference TMS 380;

the main services provided by the MAC lower layer are:

variable message length;

integration of level 2 protection;

point-to-point dialog or broadcast; and managing various different priority levels.

A disturbance on the ring may be of limited duration, as occurs, for example, when a station is inserted or withdrawn, or it may be of longer duration in the event of a breakdown. Mechanisms are provided at the MAC lower layer for protecting the ring, and indeed for completely eliminating the station responsible for a breakdown. If detection and confinement of a breakdown take several milliseconds to several seconds or even tens of seconds, that is not compatible with the requirements of data transmission operating in real time, as is the case, for example, when switching in a telecommunications exchange. The LLC upper layer of level 2 is generally implanted in each adapter and is not suitable for real time operation.

The object of the invention is to allow stations to interchange messages in real time by means of a token ring type loop and to allow them to continue by means of a token ring type loop and to allow them to continue interchanging messages during a disturbance of said loop.

Another object of the invention is to avoid losing any messages during a disturbance and to avoid messages getting out of sequence.

SUMMARY OF THE INVENTION

The present invention provides a system for interchanging messages in real time between stations interconnected by a loop link having two rings, each of which uses a token access method, each station having one adapter per ring, a coupler fitted with a processor and connected to the adapters, and a terminal fitted with at least one processor and connected to the coupler via a bus, said bus conveying messages received via an adapter and the coupler to the terminal, and conveying messages delivered by the terminal for transmission purposes to the coupler, wherein the two rings operate in load sharing mode, with messages circulating in the same direction on both rings, wherein, for each adapter, the coupler includes transmission waiting queues for storing messages to be transmitted, wherein each adapter performs procedures relating to level 1 and the lower layer of level 2 only, and wherein the processor in each coupler uses a protocol for the upper part of level 2 and for level 3 to manage load sharing between the rings, switching the station over onto one of the rings in the event of a breakdown on the other ring, providing protection against detection errors detected by a transmitting station, against messages being out of sequence, against messages being duplicated, against adapter and ring breakdowns, and against short traffic interruptions due to a station being inserted or withdrawn.

BRIEF DESCRIPTION OF THE DRAWINGS

An embodiment of the invention is described by way of example with reference to the accompanying drawings, in which.

DETAILED DESCRIPTION

Figure 1:
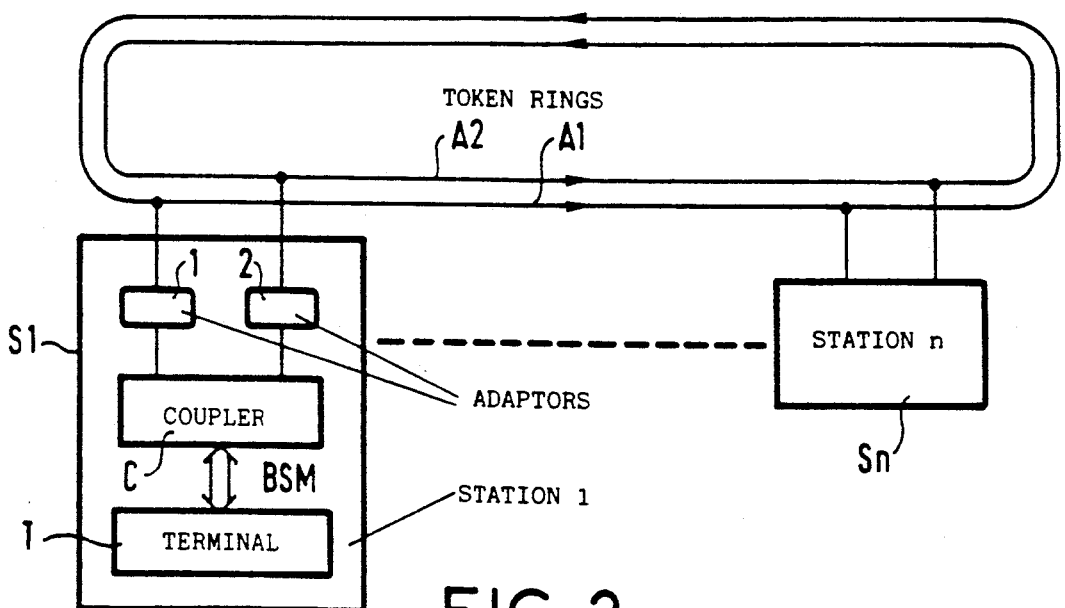
FIG. 1 shows an inter-station interchange system in accordance with the invention.

In FIG. 1, stations S1 to Sn are interconnected by two token rings A1 and A2 with tokens circulating in the same direction on both rings. Each station comprises a terminal T which is the core of that station, and which is interconnected by bus BSM to a coupler C which is in turn connected to two adapters 1 and 2, with each adapter being connected to one of the rings. For example adapter 1 is connected to ring A1 and adapter 2 is connected to ring A2. Each adapter includes message reception memories and transmission memories, and a processor circuit providing level 1 and MAC lower layer 2 processing of IEEE standard 802, only. The circuit may be constituted by a Texas Instruments TMS 380 circuit, which is designed specifically for this purpose. The coupler C includes a processor for managing interchanges between the station and the rings which are operated in load sharing mode. To this end, the processor in the coupler implements a protocol on the upper layer of level 2 and on level 3.

Each processor circuit in an adapter includes a processor, and as soon as a transmission frame has been loaded into one of the transmission memories of the adapter and is therefore waiting to be transmitted or is being transmitted, the processor of the adapter prepares for the following transmission by loading the following frame to be transmitted into one of the transmission memories of the adapter. In the following description, the term "adapter processor" is used to designate the processor in the processor circuit. Similarly, each terminal of a station comprises one or more processors and these are referred to as the "station processor(s)".

The set of adapters connected to a ring is protected by three logical entities:

the ring error collector (i.e. "ring error monitor") which has the purpose of collecting all of the errors detected by the adapters;

the supervisor (i.e. the "network manager") which serves to monitor and to change the individual state of each adapter and to manage the configuration of the ring; and the parameter server (i.e. the "ring parameter server") which serves to provide the various parameters required for operation of the ring, and is used only during initialization.

Each of these three logical entities has a functional address and is implemented in a station processor.

A station coupler needs to know about the logical machines and the various logical entities that may be implemented in the station only for the purpose of directing the messages and the end-of-transmission acknowledgements it receives. In this respect it needs to know about the configuration of the station in which it is located, i.e. for information interchanging purposes it needs to know the descriptors of the various queues that it is called on to manage.

Figure 2:
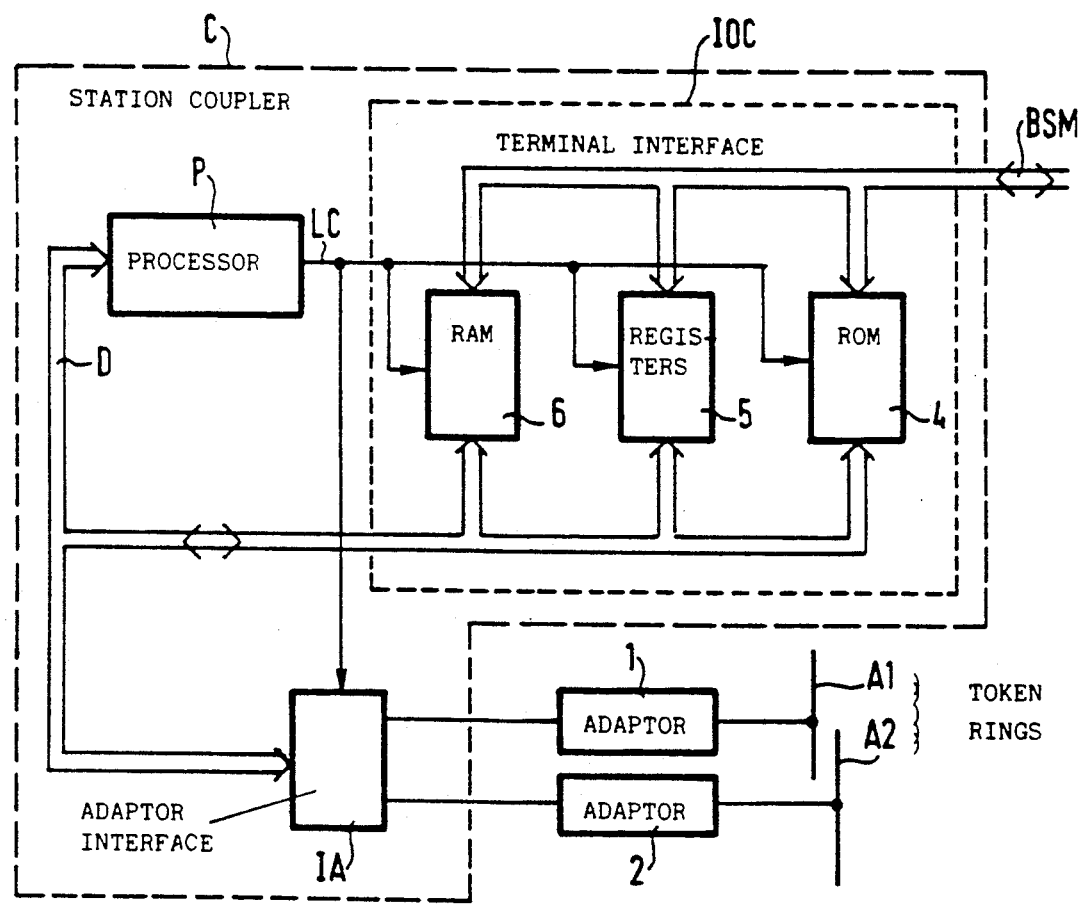
FIG. 2 is a block diagram of a coupler for a station.

FIG. 2 is a block diagram of a station coupler C. A processor P is connected by a bus D and a control link LC to an adapter interface IA and to a terminal interface IOC. The adapter interface IA is connected to the adapters 1 and 2 which are in turn connected to the rings A1 and A2. The terminal interface IOC is connected to the terminal T of the station via the bus BSM. The interface IOC includes a programmable read only memory 4 of the EPROM type, a set of registers 5, and a read/write memory 6, all connected to the bus D and to the bus BSM and to the control line LC. The memory 6 contains queues waiting to be transmitted, e.g. T queues per adapter, i.e. 1 queue for each of the 4 possible processing priority levels available to a terminal, plus a queue for messages that have been rerouted after being subjected to an attempt at transmission via the other adapter. On reception, received messages are stored in 4N terminal queues at the terminal coupler interface, where 4 is the number of possible processing priority levels and N is the number of logical machines in the terminal. The set of registers 5 contains information relating to coupling to the bus BMS. The read only memory 4 contains all of the information required for coupler operation, and in particular the protocols for the upper layer of level 2 and for level 3.

In the description below, the term "data logical link" is used to designate a transmitter-destination pair, where the transmitter is a station and the destination is either one station or a group of stations. There are two data logical links pair transmitter-destination pair, one of which uses one of the rings as first choice and the other of which uses the other ring as first choice.

The main functions relating to conveying messages as provided by upper layer level 2 and by level 3 are the following: managing the ring; detecting and correcting transmission errors; and providing protection against wrong sequencing, duplications, and breakdowns.

Managing the Ring

The two rings operate on a load-sharing basis. At each station, half of the data logical links use one of the rings on a first choice basis, and vice versa. The messages on a data logical link include a forward sequence number NSA, with each message being given a forward number modulo M, where M is equal to 256.

When returning to operation on both rings after a breakdown, traffic is re-balanced. In normal operation, i.e. when no errors occur, a data logical link has only one physical path, i.e. one of the rings. This ensures that messages do not get out of sequence.

Detecting and Correcting Transmission Errors

Errors are detected by the transmitter (i.e. the transmitting station) by making use of the level 1 acknowledgement as provided by the adapter: error flag, frame not copied flag, address not recognized flag, and also by timing the messages. These categories of failure should give rise to a message loss rate which is less than $10^{-7}$ since these faults are detected by the transmitter and they are therefore capable of being correctly processed since the terminal of the transmitting station is informed and the coupler provides explicit co-ordinates concerning the message in question. This message loss rate is obtained by ensuring that the receive buffer memories of the adapter are sufficiently large and by retransmitting erroneous messages over the other ring, with a single retransmission sufficing.

Providing Protection Against: Wrong Sequencing, Duplications, and Non-Detected Faults Messages can get out of sequence during any of the following abnormal conditions:
- breakdown at an adapter or a station (coupler, terminal);
- insertion of or withdrawal of a station;
- transmission faults affecting a ring or an adapter; and
- congestion of an adapter.

By sharing traffic over the two rings (one ring per data logical link) activation of this protection function is limited to abnormal conditions, with the rate at which messages get out of sequence being less than $10^{-7}$.

Messages may be duplicated each time there is a transmission fault, estimated to occur at a rate of $10^{-5}$, or each time an as-yet undetected breakdown occurs, as happens typically when messages are retransmitted. In practice, it suffices for there to be a fault on the return path back from the destination to the transmitter, i.e. one fault in two, on average, for messages to be duplicated.

Faults are detected and corrected under such abnormal conditions by the receiver, i.e. the destination station of the message. For non-broadcast messages, the procedure used is the following. The receiver monitors the sequence of forward sequence numbers, NSA, for each data logical link, and if it detects a gap in the sequence or if it receives two identical numbers, then there is a fault.

On detecting that a message is missing from a data logical link (two forward sequence numbers NSA more than unity apart), the procedure is as follows: the, or each, message that has arrived too soon is stored in a temporary queue in the coupler while waiting for the possible arrival of the late message, thereby making it possible to continue supplying the terminal with messages in sequence. This waiting period is protected by a time-out of a few milliseconds, after which the messages are delivered to the terminal. If the missing message arrives after the time-out, the coupler does not deliver it. The rate at which this occurs is estimated to be less than $10^{-10}$.

The temporary queues should become saturated at a rate of less than $10^{-3}$.

On detecting a duplicated message, the coupler should deliver only one copy of the message to the terminal.

The above-mentioned abnormal conditions which are potential causes for switching over to the other ring, are now examined and solutions are mentioned for limiting unnecessary switchovers.

Adapter Faults

The protective measures required for avoiding a breakdown disturbing overall traffic flow are examined without assuming particularly high-quality efficiency and speed in the detection means specific to providing such protection.

Depending on the location of the breakdown, the type of breakdown, and the detection means, there are two types of breakdown which can have repercussions on overall traffic, and these two types of breakdown are examined below.

The breakdown may cause a token to be absent. For example the currently active monitor does not manage to send a ring purge signal for one second and decides to enter into the monitor contention stage. In this type of fault, none of the adapters connected to the ring receives a signal since the various time-outs used for standard protective purposes are about 1 second in duration, which time is much longer than the time required to saturate the waiting queues. Ring switchover must therefore have taken place long before that, with the criterion for deciding to switch over being a transmission time-out which is shorter than the time required to saturate the queues, e.g. 16 ms or 32 ms, but greater than the time typically required for a ring to recover after a station has been inserted or withdrawn. This transmission time-out is started by the processor in the coupler at the moment it instructs an adapter to transmit a message, and it continues until it has received the transmission status. If the transmission time-out is exceeded, then it is time to switch over to the other ring. This type of breakdown causes all of the stations to switch over to a single ring substantially simultaneously, and while this is happening it is essential neither to loose messages nor to get messages out of sequence. On receiving messages, the receiver coupler processors correct possible wrong sequencing by means of the forward sequence numbers NSA, as described above.

The breakdown does not give rise to token absence, but the messages are never copied by the adapter of the destination station. The transmitter, i.e. the station transmitting a message continues to receive an "address not recognized" or a "frame not copied" flag. In order to ensure good traffic flow, it is necessary to provide protection against faults of this type since they can penalize transmitter couplers heavily. The transmission of a message to a station whose adapter is not functioning is followed by retransmission of the same message in an attempt to reach the destination station. This is what typically happens when an adapter breaks down without disturbing the circulation of tokens, however it may also occur if there is congestion in the destination station or in its adapter.

For this type of breakdown, the detection criterion is overflow of a counter for counting the number of failures to transmit to a given station via one of the rings. The transmitter then decides to switch over to the other ring in an attempt to reach the station.

Insertion or Withdrawal of an Adapter

This operation stops the flow of traffic on the ring corresponding to the adapter: signal is momentarily lost, and the token disappears. So long as the duration of the disturbance remains acceptable, i.e. so long as messages can be stored in transmission queues (i.e. about 10 ms to 15 ms), it is not desirable to switch rings. The length of time for which a ring is interrupted due to insertion or withdrawal of an adapter may vary as a function of whether or not the active monitor is present on the station corresponding to the adapter (there is a hold up of at least 50 ms on a ring if an active monitor is removed therefrom, since it is the monitor which regenerates the clock signal), and as a function of the method used for removing the adapter (switching off its power supply or giving it a deinsertion instruction).

Consequently, the same station is never the active monitor on both rings.

In most cases, and in particular when inserting an adapter, the insertion or withdrawal of an adapter takes place in less than the 10 ms which corresponds to the duration of the disturbance caused by the insertion relay of the adapter. In other cases, the transmission time-out of 10 ms to 15 ms described above for various types of breakdown serves to decide whether or not to switch over: a transmitting station may decide to transmit all of its messages via the other ring.

Transmission Faults Affecting a Ring or an Adapter

For faults of this type which are transient, retransmitting the message over the other ring should ensure that transmission takes place reliably, and there is no need to continue the switchover for following messages.

Adapter Congestion

Adapter congestion should not, of itself, give rise to a switchover. When adapter congestion occurs, the procedure is as follows: after a first failure to send a message to a station via one of the rings due to adapter congestion in the destination station, a second transmission attempt is made on the other ring.

All failures relating to one of the data logical links, regardless of whether they are due to adapter breakdown or to adapter congestion, are counted in the station couplers by a counter on each data logical link for counting the number of failures thereon, and a switchover is invoked only when the counter overflows. Naturally, failures realting to a data logical link are counted only in the transmitting station.

In each station, these counters are used by the software for protecting the coupler in order to detect faults quickly and in order to ensure that they are brought up to date.

When the counter relating to one of the data logical links overflows, the coupler decides that the link in question is unaccessible and informs its local protection means. The local protection means compares information from both data logical links and declares that the destination station is unaccessible. The local protection means is a software entity which draws conclusions from all of the faults or anomalies detected by a station. This type of detected message loss is acceptable and this type of operation serves essentially to reduce the probability of switchover merely because of congestion. The next message will be given the same forward sequence number as the number that could not be transmitted.

Regardless of the reason for a changeover, the changeover itself should not cause any message to be lost and should not get messages out of sequence. If messages do get out of sequence, this is corrected by the receiving stations so long as it occurs within the limit set by the time-out, with each receiving station seeking to correct wrong sequences only during the 10 ms to 15 ms, for example, following a switchover.

The forward sequence number NSA is used for detecting wrong sequencing or message loss over a data logical link. Any break in the sequence of forward sequence numbers causes messages that have arrived too soon to wait in a receive waiting queue for a maximum length of time fixed by the time-out. When the time-out expires, it is assumed that any missing message is lost and the messages in the receive queue are delivered to the terminal.

Switchover is accompanied by sending information to the local protection means which is then put into operation for returning to the normal ring. Such a return is effective after a return test procedure on the normal ring has been successful and after a time-out has elapsed whose value is greater than the time required to detect breakdowns.

An attempt at transmission is considered as having failed either on receiving an error (frame not copied, transmission fault, etc.), or else because the transmission time-out has overflowed after being started in the adapter by the coupler processor at the moment the message transmission command was enabled at the adapter.

After K failed attempts at transmitting a message via both rings, P attempts on one ring and Q attempts on the other ring where $K=P+Q$, then the message is lost. However final switchover from one ring to another still does not take place. On rings having a data rate of 4 Mbit/s, $K=2$, and $P=A=1$. At higher data rates, the value of K may be increased by 1 or 2, but should not be greater than 4.

As mentioned above, all failures relating to a data logical link are counted by a counter with there being one counter per data logical link, and each message transmission is protected by a transmission time-out of about 10 ms to 20 ms, with the duration thereof being greater than the mean temporary nonavailability time of a ring that occurs when a station is inserted or withdrawn, and less than the time required for transmission waiting queues to saturate. If the transmission time-out overflows, that means that the ring is completely unavailable.

After the counter which counts the number of failures on a data logical link has overflowed, then said data logical link is switched over to the other ring. On the transmission time-out expiring, the coupler of a station decides to switch over to the other ring all of the data logical links it is handling for transmission purposes on the ring whose transmission time-out has just overflowed, which ring is considered as being unavailable. A test prior to returning on the said unavailable ring takes place later on, at the initiative of the local protection means, in order to allow traffic from the station to be put back into balance on both rings.

Message Broadcasting Is Now Considered

Broadcasting is a facility offered by virtue of the "ring" notion and which makes it possible to considerably reduce the number of messages that are interchanged, but it is not treated specially by the adapters. So long as one station accepts a message, it then appears that a broadcast has been successful since the frame copied bit FCI and the address recognized bit ARI are at value zero on transmission. When broadcasting a message, the transmitting station can never find out whether or not the broadcast message has been received by all of the destination stations merely by observing the FCI and ARI bits it receives. This has the following consequences:

it is necessary to guarantee an error loss rate in the event of adapter congestion which is less than $10^{-10}$, since any lost message is equivalent to a non-detected error; and the mechanism for obtaining protection against adapter breakdowns based on counting the number of faults per data logical link is not suitable for broadcasting since an adapter breakdown will not be observed. However transmission faults are detected and automatically cause the message to be rebroadcast. In all other cases, broadcast messages are treated in the same way as other messages.

Like other messages, broadcast messages are given a forward sequence number.

Figure 3:
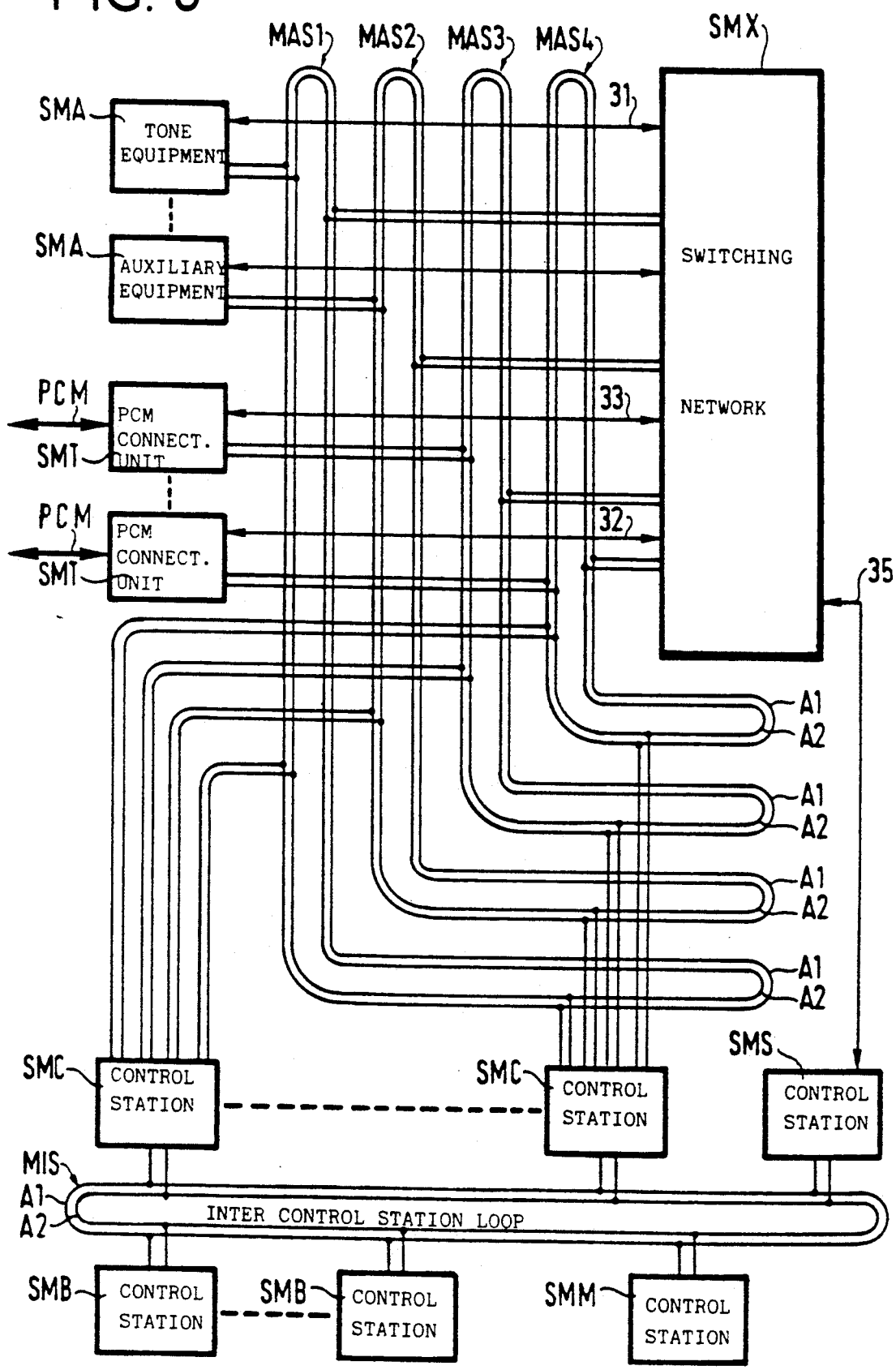
FIG. 3 is a block diagram of a telecommunications exchange using the interchange system of the invention.

FIG. 3 shows a telecommunications exchange in which the various units each constituting a station are connected together via ring links of the invention.

The stations SMB, SMC, SMS, and SMM are control stations interconnected by an inter control station loop MIS constituted by two rings A1 and A2.

The stations SMA and SMT1 to SMTn are respectively: m stations fitted with auxiliary and tone equipment, and n connection units connected to 2 Mbit/s PCM multiplex links. Each of these stations is connected to a switching network SMX via respective multiplex links 31, 32, and 33. The switching network and the stations are connected to loop links MAS1 to MAS4 giving access to the control stations, with each loop link comprising two rings A1 and A2. The switching network SMX is connected to each of the loop links and to both rings in each of them, and each station is connected to both rings of any loop link to which it is connected. The number n of loop links lies in the range 1 to 4 depending on the capacity of the telecommunications exchange and on the data rate of the links, with stations being distributed over the loop links so as to spread the traffic load. Each semaphore station SMS is connected via a multiplex link 35 to the switching network SMX.

The number of control stations SMB, SMC, and SMS is a function of exchange capacity. Each control station SMC is connected to all of the loop links MAS.

The control stations support logical machines implanted in the terminal of each station. Each logical machine corresponds to a function implanted in a processor of the terminal, and a station supports one or more logical machines. The various logical machines are the following:

a marker logical machine (MQ) which performs the following operations:

switching messages between the switching network SMX and the stations, and also between the connection units SMT and the other stations;

controlling and monitoring connections in the switching network;

managing the multiplex links 31 to 33 to which the switching network is connected;

managing operator positions; and acting as a bridge between the loops MIS and MAS.

A multiregister machine (MR) for setting up and clearing down calls, and also for making test calls.

A logical charging machine (TX) whose functions are to calculate call charges, to establish detailed billing and manage subscriber accounts, to perform temporary traffic observation, and to supervise charged subscribers.

A translator logical machine (TR) whose purpose is to provide the multiregister, charger, and user (see below) logical machines with the characteristics of the subscribers and the circuits required for setting up and clearing down calls.

A No. 7 semaphore logical machine (PE/PU) whose purpose is to perform the following operations when processing CCITT No. 7 semaphore signalling:

managing semaphore channels (level 2);

processing signalling messages, in particular message discrimination and distribution (level 3);

managing telephone resources (level 4); and routing signalling messages (level 3).

A No. 7 central logical machine (PC) for performing:

management of the semaphore network, i.e. management of traffic, routes, and semaphore channels;

tests and maintenance functions; and a function of centralizing observations.

A stations logical machine (SM) which performs the system functions for each station and comprises a network manager for managing the configuration of the stations SMB, SMC, SMS, SMA, SMT, SMX, and SMM.

A switching network logical machine (GX) for managing the switching network SMX.

A central logical machine (OC) for controlling the switching of messages relating to maintenance, and for providing access to the maintenance logic machine (OM) of a maintenance and operating unit.

A connection logical machine (URM) having the function of managing circuit status, time slot by time slot, and managing PCM multiplex links with remote electronic satellite concentrators and with digital satellite exchanges.

An auxiliary logical machine (ETA) for handling tones and the status of auxiliary equipment.

A switching logical machine (COM) for setting up, supervising, and clearing down connections through the switching network SMX.

And a maintenance logical machine (OM) for performing maintenance functions for all of the stations, and also for keeping archives.

In general, the logical machines are implanted in the connection stations as follows:

station logical machines are implanted in all stations;

multiregister logical machines (MR), charging logical machines (TX) and marker logical machines (MQ) are implanted only in SMC control stations;

No. 7 semaphore logical machines (PE/PU) are implanted only in semaphore control stations SMS;

auxiliary logical machines (ETA) are implanted only in the stations SMA;

the connection logical machines (URM) are implanted only in SMT connection stations;

the switching logical machine (COM) is implanted only in the station SMX, i.e. the switching network;

the central logical machines (OC) and the maintenance logical machines (OM) are implanted only in the SMM control stations;

the translator logical machine is implanted either in an SMB control station or else in an SMC control station; and the No. 7 central logical machine (PC) is implanted in any one of the control stations SMB, SMC, and SMS.

The way in which the logical machines are spread amongst the control stations and the number of stations are functions of the capacity of the exchange.

For example, the spread and the number of stations could be as follows:

in a small capacity exchange, there may be two stations SMB fitted with logical machines PC, two station SMC fitted with translator, marker, charging, and multiregister logical machines, two semaphore stations SMS each fitted with a No. 7 semaphore logical machine, and a station SMM fitted with the central and maintenance logical machines.

In a medium capacity exchange, there may be two stations SMB fitted with PC logical machines, two stations SMC fitted with multiregister logical machines, two stations SMC fitted with marker, translator, and charging logical machines, and a plurality of semaphore stations SMS fitted with No. 7 semaphore logical machines, and a station SMM fitted with central and maintenance logical machines.

For a large capacity exchange, there may be two stations SMB fitted with translator logical machines, two stations SMB fitted with PC logical machines, two stations SMC fitted with charging logical machines, two stations SMC fitted with marker logical machines, a plurality of stations SMC fitted with multiregister logical machines, a plurality of semaphore stations SMS fitted with No. 7 semaphore logical machines, and a station SMM fitted with central and maintenance logical machines.

The stations SMB are connected solely to the inter control station loop MIS. The stations SMC are connected to the inter control station loop MIS and to all of the loop links MAS. The stations SMC therefore have one coupler for the loop link MIS and one coupler per loop link MAS, whereas the stations SMB and SMS only have a coupler for the inter control station loop link MIS.

Loop links MIS and MAS have data rates of 4 Mbit/s or of 16 Mbit/s, for example. Since each loop link is constituted by two rings, these data rates naturally apply to each of the rings.

It is mentioned above that the number of MAS loop links lies in the range 1 to 4 depending on the capacity of the exchange and on the data rate of the links. For example, one 4 Mbit/s MAS loop link suffices for 512 multiplex links each at 2 Mbit/s, and 4 MAS loop links suffice for an exchange switching traffic over 2048 multiplex links. With MAS loop links operating at 16 Mbit/s, a single MAS loop link suffices for 1024 2 Mbit/s multiplex links, so 2 MAS loop links suffice for an exchange switching traffic over 2048 multiplex links.

The system for interchanging messages in real time between stations is applicable to any set of stations interchanging messages in real time, with a telecommunications exchange merely constituting an example. Local networks using the token method are widely used in many industries, e.g. for controlling industrial manufacturing processes, or for controlling operating systems, thus constituting other applications for an interchange system of the invention.

We claim:

1. A message interchange system for interchanging messages in real time between stations interconnected by a loop link having two rings, each of which uses a token access method, each station having one adapter per ring, a coupler fitted with a coupler processor and connected to the adapters, and a terminal fitted with at least one terminal processor and connected to the coupler via a bus, said bus conveying received messages received via each said adapter and the coupler to the terminal, and conveying transmission messages delivered by the terminal for transmission purposes to the coupler, wherein the two rings operate in load sharing mode, with said messages circulating in the same direction on both rings, wherein, for each adapter, the coupler includes transmission waiting queues for storing transmission messages to be transmitted, wherein each adapter performs procedures relating to level 1 of IEEE Standard 802 and the lower layer of level 2 of IEEE Standard 802 only, and wherein the processor in each coupler uses a protocol for the upper part of said level 2 and for level 3 of IEEE Standard 802 to manage load sharing between the rings, switching the station over onto one of the rings in the event of a breakdown on another ring, providing protection against transmission errors detected by a transmitting station, against messages being out of sequence, against messages being duplicated, against adapter and ring breakdowns, and against short traffic interruptions due to a station being inserted or withdrawn.

2. A message interchange system according to claim 1, wherein the protection against transmission errors in a message transmitted over one of the rings via an adapter consists in detecting transmission errors using an acknowledgement received by said adapter and in retransmitting said message via another adapter of the station and another ring.

3. A message interchange system according to claim 1, wherein each message is transmitted with a forwards sequence number, wherein each transmission corresponds to two data logical links each constituted by a transmitter and destination pair in which the transmitter is a transmitting station and the destination is at least one other of said stations, wherein in each station of the system the coupler includes at least one receive waiting queue for message storage for each of a plurality of logical machines fitted in the station, wherein for providing protection against messages being duplicated and messages being out of sequence, the coupler checks, each time it receives a message from a data logical link, that the forwards sequence numbers are in sequence, wherein in the event of a message being duplicated, said coupler delivers only one copy of said message to the terminal station, and wherein in the event of detecting that a message is missing from one of said data logical links, said coupler stores messages having forwards sequence numbers higher than the number of the missing message in receiving waiting queues of the data logical link while waiting for the missing message, and delivers the messages stored in the receive waiting queue to the terminal only after a certain maximum length of time fixed by a time-out has elapsed, with the missing message then being ignored if it arrives after said time-out has expired.

4. A message interchange system according to claim 1, wherein one of said stations may be an active monitor on one ring only, with each ring having a different active monitor station.

5. A message interchange system according to claim 1, wherein for providing protection against traffic interruptions due to one of said stations being inserted in one of said rings or withdrawn therefrom, and against adapter breakdowns that cause a token to be absent, the coupler runs a transmission time-out each time it transmits a message and until it receives an acknowledgement, said time-out lasting for a period of time shorter than the time in which the transmission waiting queue saturates, and when said transmission time-out expires, the coupler causes traffic to be switched over to another one of said rings.

6. A message interchange system according to claim 1, wherein two data logical links correspond to each of a plurality of transmitter-destination pairs in which the transmitter of a transmitter-destination pair is one of said stations and the destination is at least one other of said stations, and wherein protection is provided against adapter breakdowns that do not give rise to token absence but which do cause a transmission fault, the coupler counts transmission faults on each data logical link and causes the station corresponding to the coupler to switch over to another logical link after a certain number of faults has been counted.

7. A message interchange system according to claim 1, comprising first and second sets of said stations constituting a telecommunications exchange, wherein the stations of the first set are control stations interconnected by an inter control station link loop having two rings, wherein the stations of the second set are connection units connected to multiplex lines, tone equipments, and auxiliary equipments, and a switching network all connected to at least one loop link giving access to the control stations, wherein the connections units, the tone equipments and the auxiliary equipments, are connected directly to the switching network via multiplex links, wherein the control stations are fitted with at least one marker logical machine for performing functions such as managing each of a plurality of operator positions, at least one multiregister logical machine for performing functions such as setting up and clearing down calls, at least one charging logical machine for performing functions such as calculating call charges, at least one No. 7 semaphore logical machine for performing functions such as managing each of a plurality of semaphore channels, and at least one translator logical machine for performing functions such as providing the circuits required for setting up and clearing down calls, wherein each control station which includes at least one multiregister logical machine, charging logical machine, or marker logical machine is also connected to the loop links giving access to control stations, and wherein each semaphore station which includes at least one No. 7 semaphore logical machine is connected directly to the switching network.

8. A message interchange system according to claim 7, wherein the stations in the second set are connected to loop links giving access to control stations, with the switching network being connected to all of said loop links, and with each of said stations of the second set being connected to one of said loop links only, said control stations being shared between said loop links, and wherein each control station is connected to all of the loop links giving access to the control stations.

* * * * *